US012695705B1

(12) United States Patent
Burns et al.

(10) Patent No.: US 12,695,705 B1
(45) Date of Patent: Jul. 28, 2026

(54) MULTIPATH TRANSMISSION OF REAL-TIME DATA FLOWS

(71) Applicant: Amazon Technologies, Inc., Seattle, WA (US)

(72) Inventors: Nathan Burns, Chesterfield, MO (US); Ryan M. Sherman, Clifton, VA (US); Ismael Gonzales, Littleton, CO (US); Aaron Gowatch, Denver, CO (US); Cody Planteen, Denver, CO (US)

(73) Assignee: Amazon Technologies, Inc., Seattle, WA (US)

( * ) Notice: Subject to any disclaimer, the term of this patent is extended or adjusted under 35 U.S.C. 154(b) by 389 days.

(21) Appl. No.: 18/212,551

(22) Filed: Jun. 21, 2023

(51) Int. Cl.
*H04L 47/2483* (2022.01)
*H04L 1/00* (2006.01)

(52) U.S. Cl.
CPC ........ *H04L 47/2483* (2013.01); *H04L 1/0061* (2013.01)

(58) Field of Classification Search
CPC .......................... H04L 47/2483; H04L 1/0063
USPC ......................................................... 370/230
See application file for complete search history.

(56) References Cited

U.S. PATENT DOCUMENTS

| | | | |
|---|---|---|---|
| 2009/0193314 A1* | 7/2009 | Melliar-Smith .. | H03M 13/2921 714/755 |
| 2012/0278678 A1* | 11/2012 | Kruglick ............... | H04L 1/0056 714/752 |
| 2013/0322331 A1* | 12/2013 | Ramkumar ......... | H04L 47/2416 370/328 |
| 2018/0284758 A1* | 10/2018 | Cella .................. | G05B 23/0264 |
| 2019/0190653 A1* | 6/2019 | Langhammer ........ | H04L 1/0057 |

* cited by examiner

*Primary Examiner* — Asad M Nawaz
*Assistant Examiner* — Hugh Mark Ashley
(74) *Attorney, Agent, or Firm* — Klarquist Sparkman, LLP

(57) ABSTRACT

Communication systems and associated methods are described for transmitting a real-time digital data flow through a network via a plurality of corresponding sub-flows or streams including data from the real-time digital data flow and/or parity information. A source system may receive a real-time digital data flow and generate the plurality of data streams of the real-time digital data flow and at least one parity stream including parity data for the real-time digital data flow. The source system may transmit the plurality of data streams and the at least one parity stream in parallel along different respective paths to a destination device. One or more parameters of the stream generation and/or transmission may be adjusted based on network conditions associated with the different respective paths to the destination device.

20 Claims, 11 Drawing Sheets

Figure 2B:
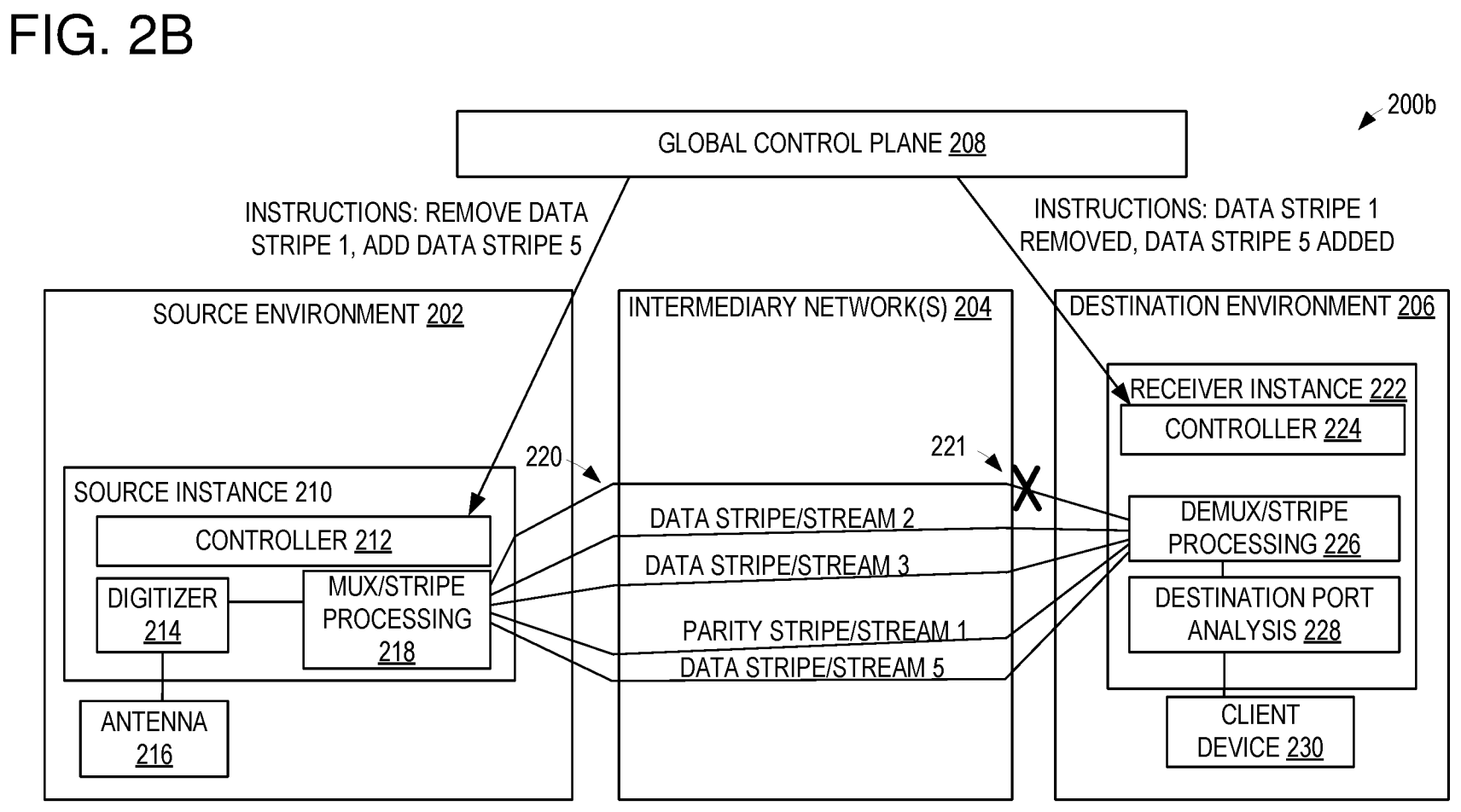

GLOBAL CONTROL PLANE 208

INSTRUCTIONS: DATA STRIPE 1 REMOVED, DATA STRIPE 5 ADDED

INSTRUCTIONS: REMOVE DATA STRIPE 1, ADD DATA STRIPE 5

DESTINATION ENVIRONMENT 206

RECEIVER INSTANCE 222

CONTROLLER 224

DEMUX/STRIPE PROCESSING 226

DESTINATION PORT ANALYSIS 228

CLIENT DEVICE 230

INTERMEDIARY NETWORK(S) 204

221

DATA STRIPE/STREAM 2

DATA STRIPE/STREAM 3

PARITY STRIPE/STREAM 1

DATA STRIPE/STREAM 5

220

SOURCE ENVIRONMENT 202

SOURCE INSTANCE 210

CONTROLLER 212

MUX/STRIPE PROCESSING 218

DIGITIZER 214

ANTENNA 216

Figure 3:
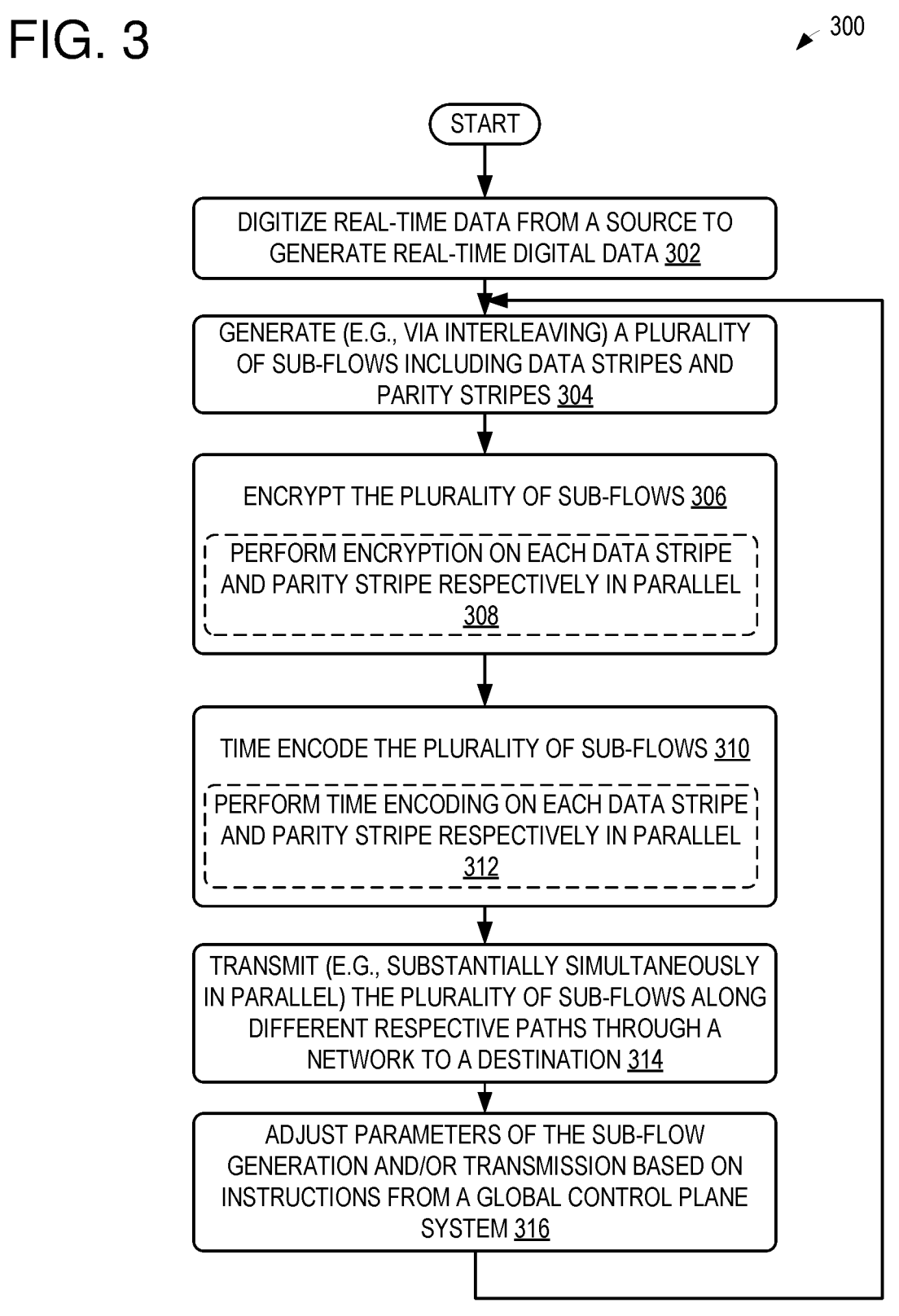

```
                        ( START )
                            │
                            ▼
┌─────────────────────────────────────────────────┐
│  DIGITIZE REAL-TIME DATA FROM A SOURCE TO         │
│  GENERATE REAL-TIME DIGITAL DATA 302              │
└─────────────────────────────────────────────────┘
                            │
                            ▼
┌─────────────────────────────────────────────────┐
│  GENERATE (E.G., VIA INTERLEAVING) A PLURALITY    │
│  OF SUB-FLOWS INCLUDING DATA STRIPES AND          │
│  PARITY STRIPES 304                               │
└─────────────────────────────────────────────────┘
                            │
                            ▼
┌─────────────────────────────────────────────────┐
│  ENCRYPT THE PLURALITY OF SUB-FLOWS 306           │
│  ┌───────────────────────────────────────────┐   │
│  │ PERFORM ENCRYPTION ON EACH DATA STRIPE    │   │
│  │ AND PARITY STRIPE RESPECTIVELY IN PARALLEL│   │
│  │ 308                                        │   │
│  └───────────────────────────────────────────┘   │
└─────────────────────────────────────────────────┘
                            │
                            ▼
┌─────────────────────────────────────────────────┐
│  TIME ENCODE THE PLURALITY OF SUB-FLOWS 310       │
│  ┌───────────────────────────────────────────┐   │
│  │ PERFORM TIME ENCODING ON EACH DATA STRIPE │   │
│  │ AND PARITY STRIPE RESPECTIVELY IN PARALLEL│   │
│  │ 312                                        │   │
│  └───────────────────────────────────────────┘   │
└─────────────────────────────────────────────────┘
                            │
                            ▼
┌─────────────────────────────────────────────────┐
│  TRANSMIT (E.G., SUBSTANTIALLY SIMULTANEOUSLY     │
│  IN PARALLEL) THE PLURALITY OF SUB-FLOWS ALONG    │
│  DIFFERENT RESPECTIVE PATHS THROUGH A             │
│  NETWORK TO A DESTINATION 314                     │
└─────────────────────────────────────────────────┘
                            │
                            ▼
┌─────────────────────────────────────────────────┐
│  ADJUST PARAMETERS OF THE SUB-FLOW                │
│  GENERATION AND/OR TRANSMISSION BASED ON          │
│  INSTRUCTIONS FROM A GLOBAL CONTROL PLANE         │
│  SYSTEM 316                                        │
└─────────────────────────────────────────────────┘
```

FIG. 4

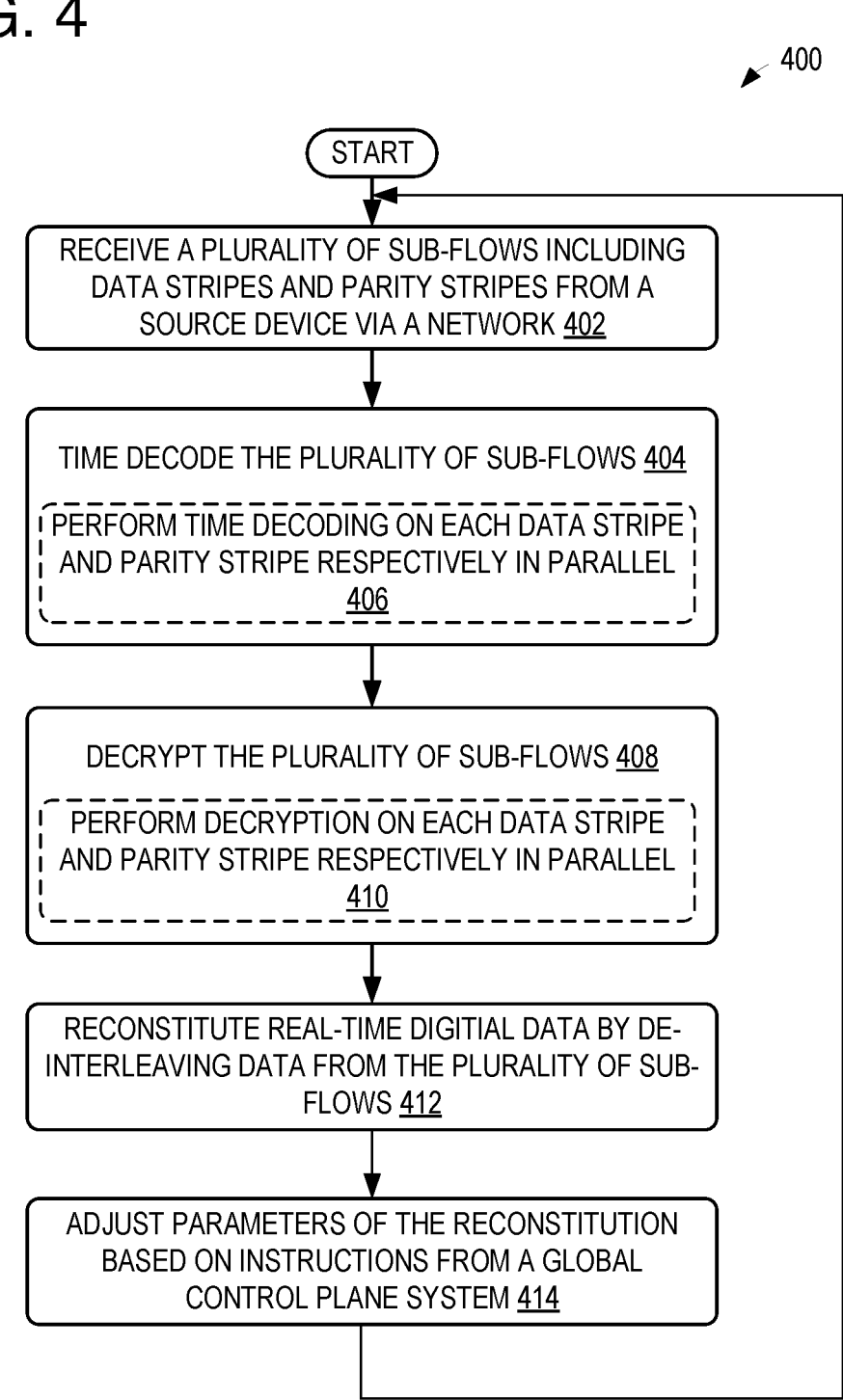

400

START

RECEIVE A PLURALITY OF SUB-FLOWS INCLUDING DATA STRIPES AND PARITY STRIPES FROM A SOURCE DEVICE VIA A NETWORK 402

TIME DECODE THE PLURALITY OF SUB-FLOWS 404

PERFORM TIME DECODING ON EACH DATA STRIPE AND PARITY STRIPE RESPECTIVELY IN PARALLEL 406

DECRYPT THE PLURALITY OF SUB-FLOWS 408

PERFORM DECRYPTION ON EACH DATA STRIPE AND PARITY STRIPE RESPECTIVELY IN PARALLEL 410

RECONSTITUTE REAL-TIME DIGITIAL DATA BY DE-INTERLEAVING DATA FROM THE PLURALITY OF SUB-FLOWS 412

ADJUST PARAMETERS OF THE RECONSTITUTION BASED ON INSTRUCTIONS FROM A GLOBAL CONTROL PLANE SYSTEM 414

FIG. 5

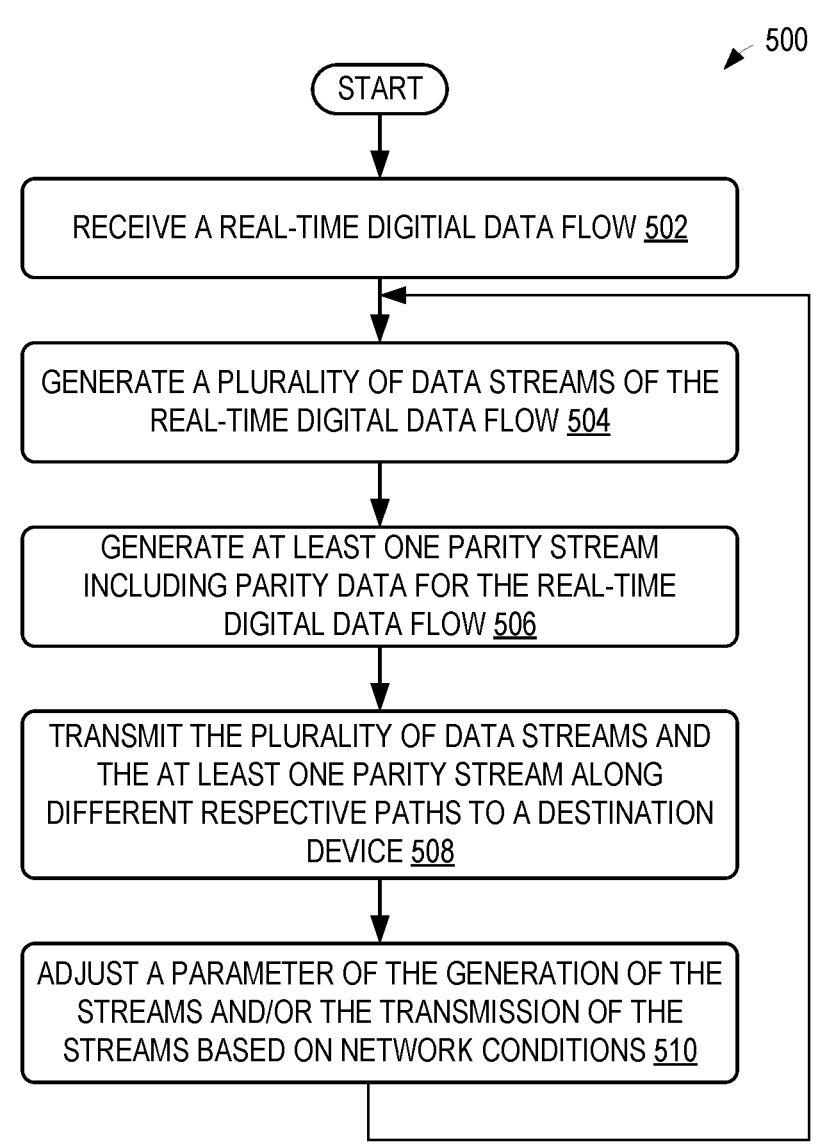

500

START

RECEIVE A REAL-TIME DIGITIAL DATA FLOW 502

GENERATE A PLURALITY OF DATA STREAMS OF THE REAL-TIME DIGITAL DATA FLOW 504

GENERATE AT LEAST ONE PARITY STREAM INCLUDING PARITY DATA FOR THE REAL-TIME DIGITAL DATA FLOW 506

TRANSMIT THE PLURALITY OF DATA STREAMS AND THE AT LEAST ONE PARITY STREAM ALONG DIFFERENT RESPECTIVE PATHS TO A DESTINATION DEVICE 508

ADJUST A PARAMETER OF THE GENERATION OF THE STREAMS AND/OR THE TRANSMISSION OF THE STREAMS BASED ON NETWORK CONDITIONS 510

FIG. 6

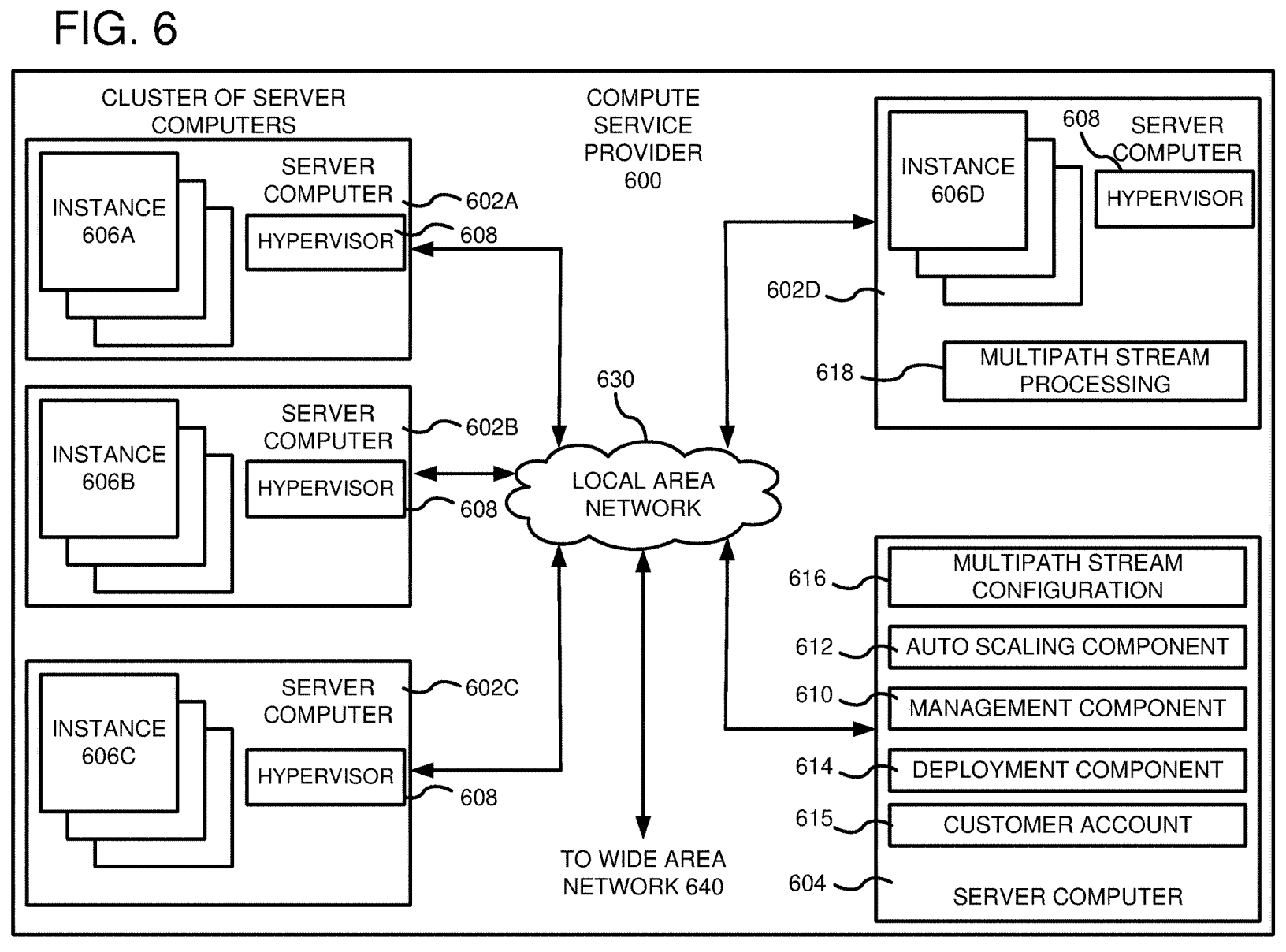

COMPUTE SERVICE PROVIDER 600

SERVER COMPUTER 608

INSTANCE 606D

HYPERVISOR

MULTIPATH STREAM PROCESSING

602D

618

MULTIPATH STREAM CONFIGURATION

AUTO SCALING COMPONENT

MANAGEMENT COMPONENT

DEPLOYMENT COMPONENT

CUSTOMER ACCOUNT

SERVER COMPUTER

616

612

610

614

615

604

LOCAL AREA NETWORK

630

TO WIDE AREA NETWORK 640

CLUSTER OF SERVER COMPUTERS

SERVER COMPUTER 602A

INSTANCE 606A

HYPERVISOR 608

SERVER COMPUTER 602B

INSTANCE 606B

HYPERVISOR 608

SERVER COMPUTER 602C

INSTANCE 606C

HYPERVISOR 608

COMPUTING ENVIRONMENT 700

730

COMMUNICATION CONNECTION(S) 770

INPUT DEVICE(S) 750

OUTPUT DEVICE(S) 760

STORAGE 740 central processing unit 710 graphics or co-processing unit 715

MEMORY 720

MEMORY 725

SOFTWARE 780 IMPLEMENTING DESCRIBED TECHNOLOGIES

MULTIPATH TRANSMISSION OF REAL-TIME DATA FLOWS

BACKGROUND

Computing systems and communication networks may be utilized to exchange information. In some applications, a computing device may request to receive a flow of incoming data from an antenna that is in communication with another device in the communication network. Servicing such data requests may encounter difficulties as the incoming flow of data is subjected to transmission mediums throughout the communication network having different associated bandwidths or data throughput limits, thereby limiting the overall transmission rate of data to the computing device.

BRIEF DESCRIPTION OF THE DRAWINGS

FIGS. 2A-2E illustrate example scenarios of adjusting configurations of stream generation and pathing for transmitting an incoming real-time data stream based on network conditions.

FIG. 3 is a flow chart of an example method of generating and transmitting a plurality of data and parity streams corresponding to an incoming real-time data stream.

FIG. 4 is a flow chart of an example method of receiving a plurality of data and parity streams and reconstituting a corresponding real-time data stream from the plurality of data and parity streams.

FIG. 5 is a flow chart of another example method of generating and transmitting a plurality of data and parity streams corresponding to an incoming real-time data stream.

FIG. 6 is an example system diagram showing a plurality of virtual machine instances running in a multi-tenant environment.

DETAILED DESCRIPTION

As described above, flows of digital data transmitted over a network may encounter different constraints to transmission parameters, such as data transmission speeds, based on communication hardware and protocols for different portions of the network. For example, single ingress data flows from the Internet to a cloud environment and/or from another ingress interface of the cloud environment may be limited to a maximum data transfer rate, which may be lower than a data transfer rate available at other points in the network. In order to effectively achieve higher than such a maximum data transfer rate for real-time data flow to be received at a destination device, the disclosure provides mechanisms for generating a plurality of streams corresponding to the real-time data flow, which are transmitted along different paths to the destination device. As further described below, parameters of the stream generation and/or transmission may be tuned on-demand to react to network conditions and improve overall data throughput and reliability. Additional details of the disclosed technologies are described below.

Figure 1:
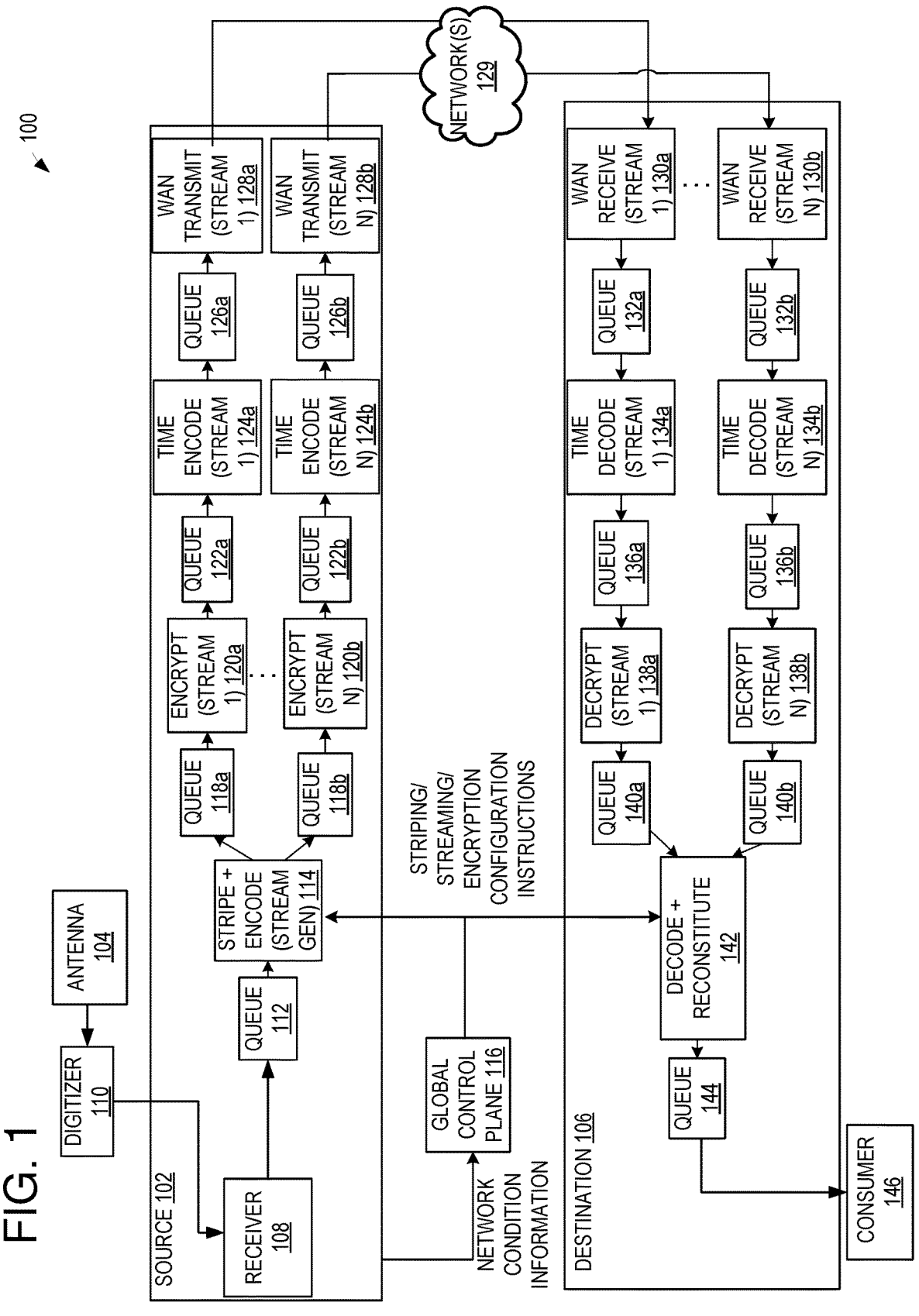
FIG. 1 is a diagram of an example communication system including processing nodes for generating and transmitting a plurality of data and parity streams corresponding to an incoming real-time data stream.

FIG. 1 shows an example communication system for transmitting data flows through a network. In the illustrated example, a real-time data flow may be received at a source system 102 from a data source, such as an antenna 104. In some examples, such as the illustrated example in which data (e.g., analog data) is received from an antenna, a digitizer 110 may be used to perform analog-to-digital conversion of the data to generate a real-time digital data flow comprising digitized data generated from the real-time data received by the antenna. A transmission of the data flow to a destination system 106 may be triggered or otherwise initiated responsive to a request, subscription, and/or other condition. In order to efficiently transmit the real-time data flow at high (e.g., greater than 5 Gbps, 10 Gbps, or 15 Gbps, in some non-limiting examples) throughput rates with minimal data loss, the source system 102 may encapsulate and process the real-time data flow to generate a plurality of transmission streams corresponding to the real-time data flow using a plurality of source-side computing nodes. As described in more detail below, the plurality of transmission streams may traverse different paths toward the destination in order to decrease overall congestion conditions experienced by the transmission streams, thereby increasing overall throughput. As further described in more detail below, parameters of the stream generation and transmission may be tuned in real-time responsive to network conditions in order to further improve speed and reliability of the transmissions.

The source system 102 may include a receive unit 108 (e.g., a Local Area Network (LAN) receive unit or other receiver) that is coupled, directly or indirectly (e.g., via digitizer 110 and/or one or more other intermediary devices), to the antenna 104 to receive the real-time data flow. In other examples, the receive unit 108 may receive the digital data flow from another data source, such as a stored file and/or or another processing, storage, and/or computing component. For example, the source system 102 may be a ground control system coupled to the antenna 104. In other examples, the source system 102 may be located closer to a destination device and may receive the real-time data flow as transmitted by a ground control system through a network. The real-time digital data flow is passed to a queue 112 for processing by a stripe and encoding (e.g., stream generation) unit 114. For example, the source system 102 may be configured to process the real-time digital data flow in stages using nodes tied together with queues. Each node may be configured to perform one or more of the processing operations described for the components of the source system (e.g., stream generation, encryption, time encoding, transmission, etc.) using one or more cores of a multi-core compute system or other computing device. The queues may include memory for enqueueing incoming data for processing at a next stage.

Accordingly, the data in queue 112, corresponding to the real-time digital data flow, may be processed by the stripe and encoding unit 114 to generate a plurality of data and parity streams (also referred to herein as sub-flows or stripes) for individual and/or parallel processing and transmission. The data streams may include data from the real-time digital data flow, and the parity streams may include parity data usable for error correction (e.g., forward error correction) of the data in the data streams. For example, the data streams may be formed by an interleaving operation, which may include distributing sequential portions of data (e.g., a select number of consecutive bits or bytes) from the real-time digital data flow to each data stream (e.g., in a round robin manner). Each parity stream may include enough error correction information (e.g., Reed Solomon codes and/or other error correction data) to recover data from one lost data stream. As an illustrative, non-limiting example, the stripe and encoding unit 114 may be configured to split the real-time digital data flow into forty data stripes and four parity stripes, allowing for recovery from up to four lost data stripes upon receipt of the streams at a destination. In other examples, the parity streams may include duplicate data for one or more of the data streams. For example, the type of information in the parity streams may be selected based on parameters such as an expected bandwidth of encapsulated data.

The streams may be encapsulated according to a communications protocol, such as User Data Protocol (UDP), to generate encoded streams of frames of the data from the antenna. In the illustrated example, N streams are generated, resulting in a processing flow through the source system that is split into N parallel paths downstream of the stripe and encoding unit 114. Although only two paths and associated sets of processing components (118-128, described below) are shown for clarity, it is to be understood that each of the N streams generated by the strip and encoding unit 114 are processed independently and/or in parallel with one another via respective processing components (e.g., nodes) as shown and described for streams 1 and N of FIG. 1.

The number of streams (e.g., the number of data streams, parity streams, and/or total streams) generated by the stripe and encoding unit 114 may be tunable, as described in more detail below. Each stream passes through nodes of a respective processing flow during which the stream is encrypted by an encryption unit (e.g., 120a/120b), time encoded by a time encoding unit (e.g., 124a/124b), and transmitted via a wide-area network (WAN) transmitter unit (128a/128b). The source-side nodes (e.g., encryption unit, time encoding unit, and transmitter unit) in the respective processing flows are separated from one another by a respective queue (queues 118a/118b, 122a/122b, and 126a/126b), which may operate as described above with respect to queue 112 (e.g., to queue data for processing at a respective downstream node).

The encryption units 120a/120b may be configured to encrypt the respective data streams using a suitable encryption mechanism. In some examples, the encryption units 120a/120b may be configured to encrypt the respective streams using a cryptographic key, which may be retrieved from a key management service associated with a client and/or the destination system 106. In additional or alternative examples, each stream may be encrypted using a different cryptographic key (e.g., a key unique to that stream). The time encoding units 124a/124b may be configured to add forward error correction data to the respective streams and/or associate the streams with a sequence number usable to help reconstitute the streams at the destination system. As a non-limiting example, for every ten sequences of bytes on a respective data stream, an additional two bytes of error correction may be added by the respective time encoding unit processing that respective data stream, allowing for recovery of up to two lost bytes at a destination. As this time encoding is performed after encryption of the data streams, the time encoding may be generated by an intermediary device along the way to a destination (e.g., the intermediary device may include a time decoder and a time encoder to recover any lost data in the data stream and then add additional error correction for the data stream before passing the data stream along to a next hop toward a destination), while preserving security (e.g., encryption) of the data stream.

The WAN transmitter units 128a/128b may be configured to transmit the respective streams along a corresponding path toward the destination system 106, where each stream traverses a different path to the destination system 106. For example, each stream may be designated with different source and destination ports (e.g., via metadata for the streams). As the streams traverse a network (e.g., network 129), hops in the network may ingest these port designations and select interfaces based on the designations (and other information in the metadata, such as source and destination internet protocol addresses), which cause the streams to traverse different paths from one another. The streams may thus traverse the network in a bufferless manner (e.g., the data in the streams may not be buffered or stored at network devices along the route to the destination) to be reconstituted as real-time data at a destination device.

Parameters of the nodes (e.g., the stripe and encoding unit 114, the encryption units 120a/120b, the time encoding units 124a/124b, and the transmitter units 128a/128b) may be configured based on control instructions received from a global control plane 116. For example, the parameters that may be configured by the control instructions may include a number of data and/or parity streams generated by the stripe and encoding unit 114, initial and/or updated pathing information for controlling (e.g., changing) paths that each of the streams traverse, encryption information (e.g., encryption keys), and/or other parameters. As shown, in some examples, the global control plane 116 may receive network condition information from the source system 102 (and/or other sources, such as network analyzers, the destination system 106, etc.) and perform real-time, on-demand adjustments of the parameters to increase throughput and/or decrease data loss in the transmissions. For example, a number of parity streams may be increased responsive to detected data loss that meets a first threshold condition (e.g., above a threshold amount or percentage), or decreased responsive to detected data loss that meets a second threshold condition (e.g., below the threshold amount or percentage, or below a different threshold amount or percentage). As another example, one or more data or parity streams may be removed or added to adjust pathing of the streams (e.g., to replace a stream encountering congestion with a stream that traverses a different, less congested path through the network) responsive to real-time and/or expected/predicted network conditions (e.g., measured latency, congestion/traffic, bandwidth usage, etc.). As described in more detail below, initial configuration parameters or instructions and/or any updates/adjustments to the configuration instructions may also be provided to the destination system 106 for use in processing received streams.

As described above, the plurality of data and parity streams may traverse different paths through the network 129 to reach the destination system 106. The destination system 106 may include a plurality of destination-side nodes to process the received plurality of streams and reconstitute the real-time digital data stream. As described above with reference to the source-side nodes, although processing flows for two streams are shown for clarity (e.g., including destination-side nodes for processing streams 1 and N), the destination system 106 is understood to include N processing flows (and associated processing units/nodes) to allow for parallel processing of each received stream. For example, the destination system 106 may include a plurality of WAN receivers 130a/130b, which are configured to receive the plurality of data and parity streams from the network 129. The destination system 106 may also include a plurality of time decoding units 134a/134b configured to decode the incoming streams in coordination with the encoding performed by time encoders 124a/124b, and a plurality of decryption units 138a/138b configured to decrypt the incoming streams in coordination with the encryption performed by encryption units 120a/120b.

The decoded and decrypted streams may be provided to a decoding and reconstitution unit 142, configured to recover the original digital data flow by blending and/or de-interleaving data from the received plurality of streams. As described above, the incoming streams may be designated with sequence numbers or other identifying metadata used to build the original digital data flow. In some examples, where a data stream is determined to be missing (e.g., a data stream with a targeted/selected/expected sequence number is not received within a threshold period of time), a received parity stream may be used to attempt to recover the missing data associated with the missing data stream. The reconstituted digital data flow may be provided to a consumer 146, which may include and/or be configured to transmit the reconstituted digital data flow to a client device or other system that requested the digital data flow. In some examples, the consumer 146 may include a LAN transmitter (e.g., a network socket). In additional or alternative examples, the consumer 146 may include an asynchronous destination such as a storage service and/or other processing or computing component, such as a file, program thread, etc. In further examples, the consumer 146 may be configured to recast the reconstituted digital data stream, for example performing operations similar to the receiver 108 to re-stripe the digital data stream for a further destination. As described above with respect to the source system, queues (132a/132b, 136a/136b, 140a/140b, and 144) may be used to tie the different processing nodes of the destination system together.

Figure 2A:
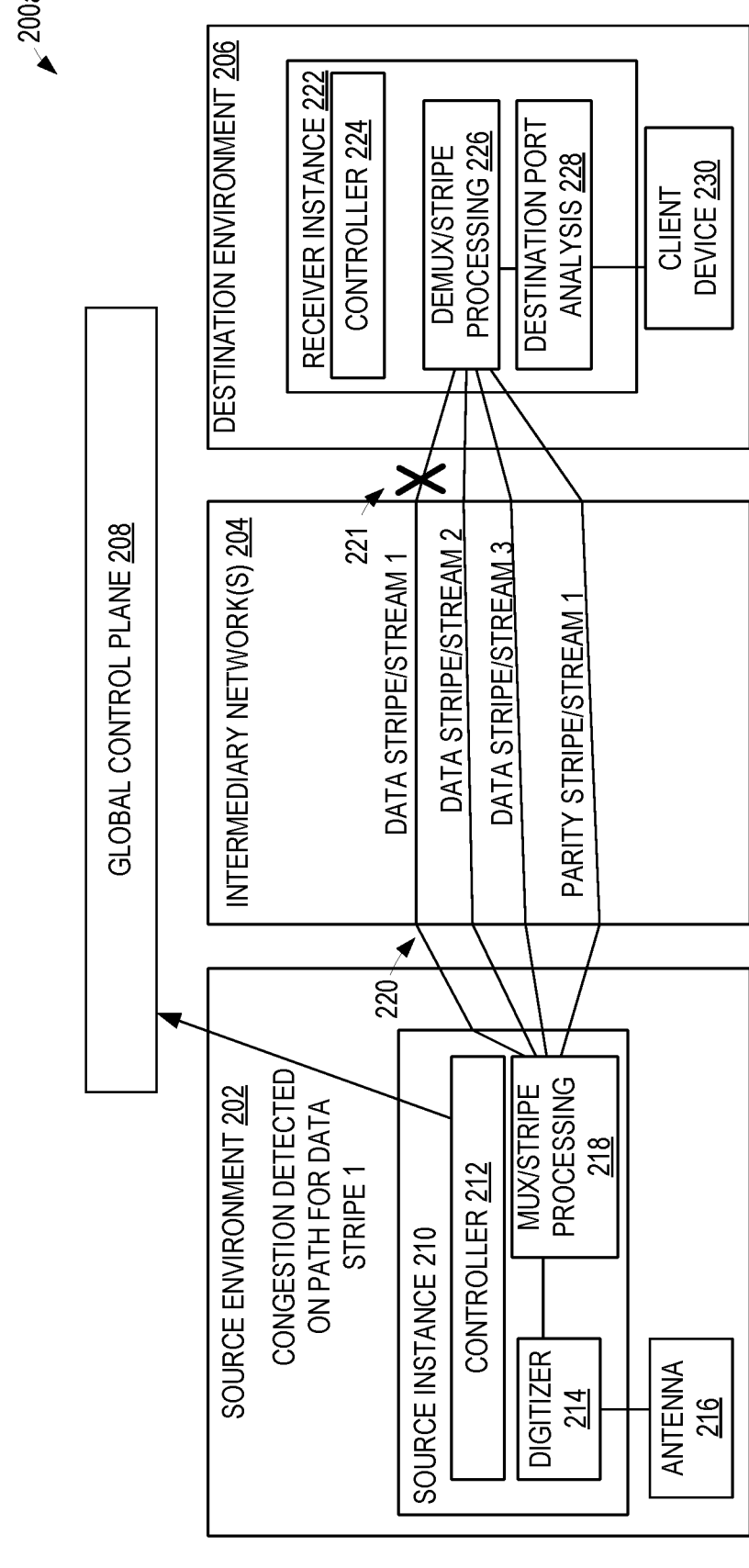

FIGS. 2A and 2B illustrate an example scenario of adjusting a pathing of streams generated in correspondence to an incoming real-time data stream based on network conditions. In a first condition of a communication system 200a, a source environment 202 is in communication with a destination environment 206 via one or more intermediary networks 204 (e.g., a border network, edge network, content delivery network, etc.). It is to be understood that the communication system 200a is shown in a simplified manner, and any number and/or configuration of intervening network devices and/or networks may be present between the source environment and the destination environment.

The source environment 202 may be a cloud environment, and may include a source instance 210 comprising a controller 212 and components for processing incoming data from an antenna 216. For example, data flow from the antenna 216 may be transformed into a digital data flow using a digitizer 214 (e.g., performing processing as described above with respect to digitizer 110 of FIG. 1). The digital data flow may be provided to a multiplexing (mux) and/or stripe processing system 218 configured to perform one or more of the operations of the nodes of the source system 102 of FIG. 1. For example, the mux and/or stripe processing system 218 may generate a plurality of data stripes/streams and one or more parity stripes/streams (e.g., three data stripes/streams and one parity stripe/stream in the non-limiting illustrated example) and process the stripes/streams in parallel (e.g., performing encryption, time encoding, etc.). As shown, the data and parity stripes/streams are transmitted along different paths 220 to reach the destination environment 206.

The destination environment 206 may also be a cloud environment, and may include a destination instance 222 comprising a controller 224 and components for processing incoming data and parity stripes/streams. For example, the incoming stripes/streams may be received and processed by a demultiplexing (demux) and/or stripe processing system 226 configured to perform one or more of the operations of the nodes of the destination system 106 of FIG. 1 (e.g., performing decoding, decryption, etc. on the stripes/streams in parallel and reconstituting the original digital data flow as described above with respect to the decoding and reconstitution unit 142 of FIG. 1). The demux and/or stripe processing system 226 may be configured to provide the reconstituted digital data flow to a destination port analysis unit 228 that is configured to determine a client device (e.g., client device 230) targeted by the digital data flow (e.g., based on metadata in the received stripes/streams and/or reconstituted digital data flow). The reconstituted digital data flow is then transmitted to the targeted client device 230.

As shown in the example scenario of 200a, congestion 221 is detected by the source environment 202 on the path traveled by data stripe/stream 1. Accordingly, an indication of the congestion is transmitted to a global control plane 208. In other examples, the global control plane may receive an indication of the congestion 221 or other network conditions/issues via other devices, such as the destination environment, one or more network devices in the border network, a network analysis system, and/or other network monitoring devices.

Turning now to the condition shown in FIG. 2B at 200b, in response to the detected congestion 221, the global control plane 208 sends cooperative control instructions to both the source environment and the destination environment regarding a removal of data stripe/stream 1 and an addition of new data stripe/stream 5, configured to traverse a different path than data stripe/stream 1. In this way, the new data stripe/stream 5 can reach the destination environment while avoiding the congestion 221, improving overall throughput of the data corresponding to the real-time digital data flow.

Figure 2C:
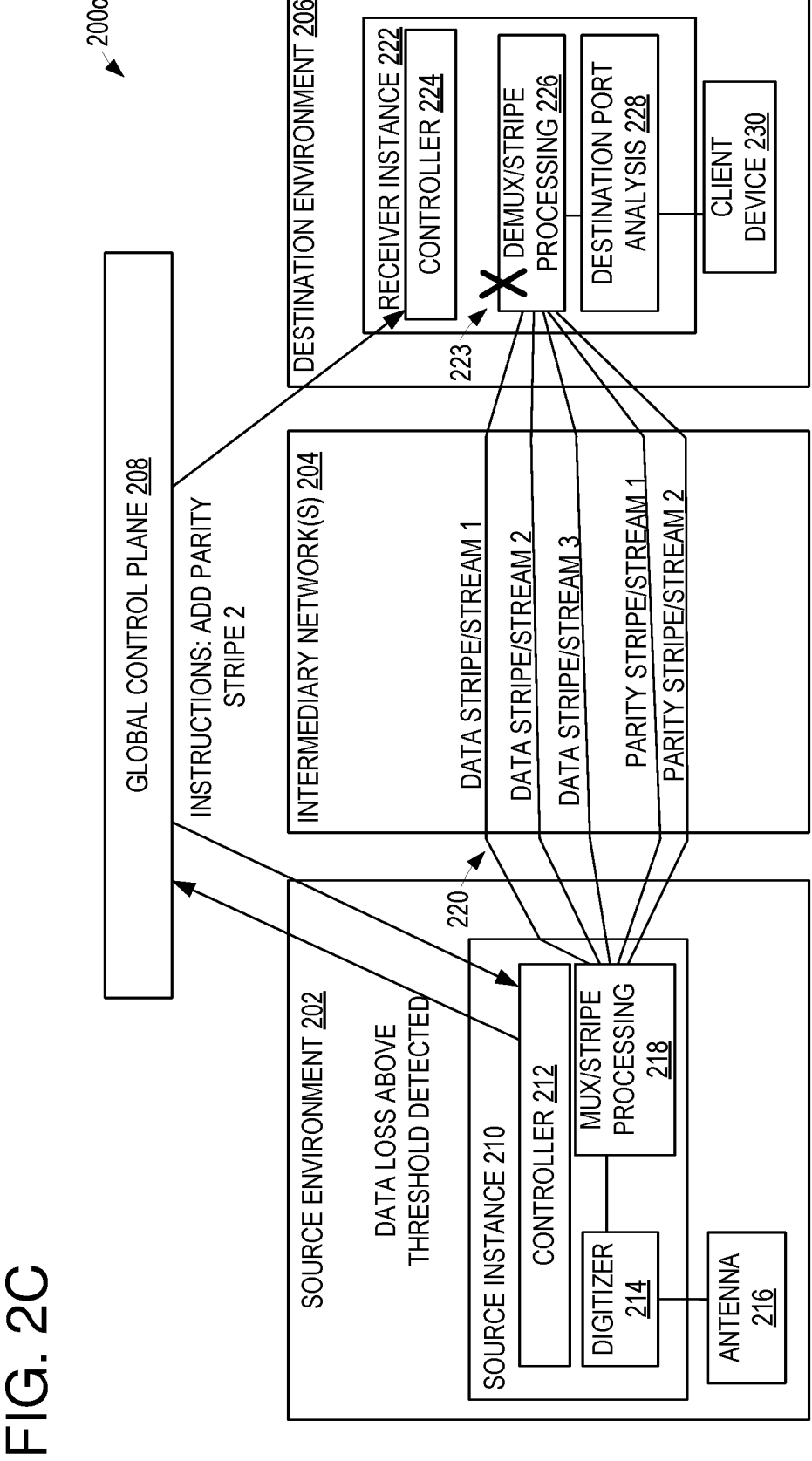

Turning now to the condition shown in FIG. 2C at 200c, an alternative to the congestion condition of 200a/200b may be encountered, such as a data flow loss event 223. In response to detecting the data flow loss event 223, the source environment 202 may send feedback, such as a notice of the data flow loss event 223, to the global control plane 208 indicating that data loss above a threshold has been detected. In response to the notice, the global control plane 208 may send cooperative control instructions to both the source environment and the destination environment regarding an addition of a parity stripe/stream (parity stripe/stream 2). In this way, the new parity stripe/stream 2 can be used by the demux and/or stripe processing system 226 to help compensate for lost data stripes/streams, improving overall integrity of the data corresponding to the real-time digital data flow.

Figure 2D:
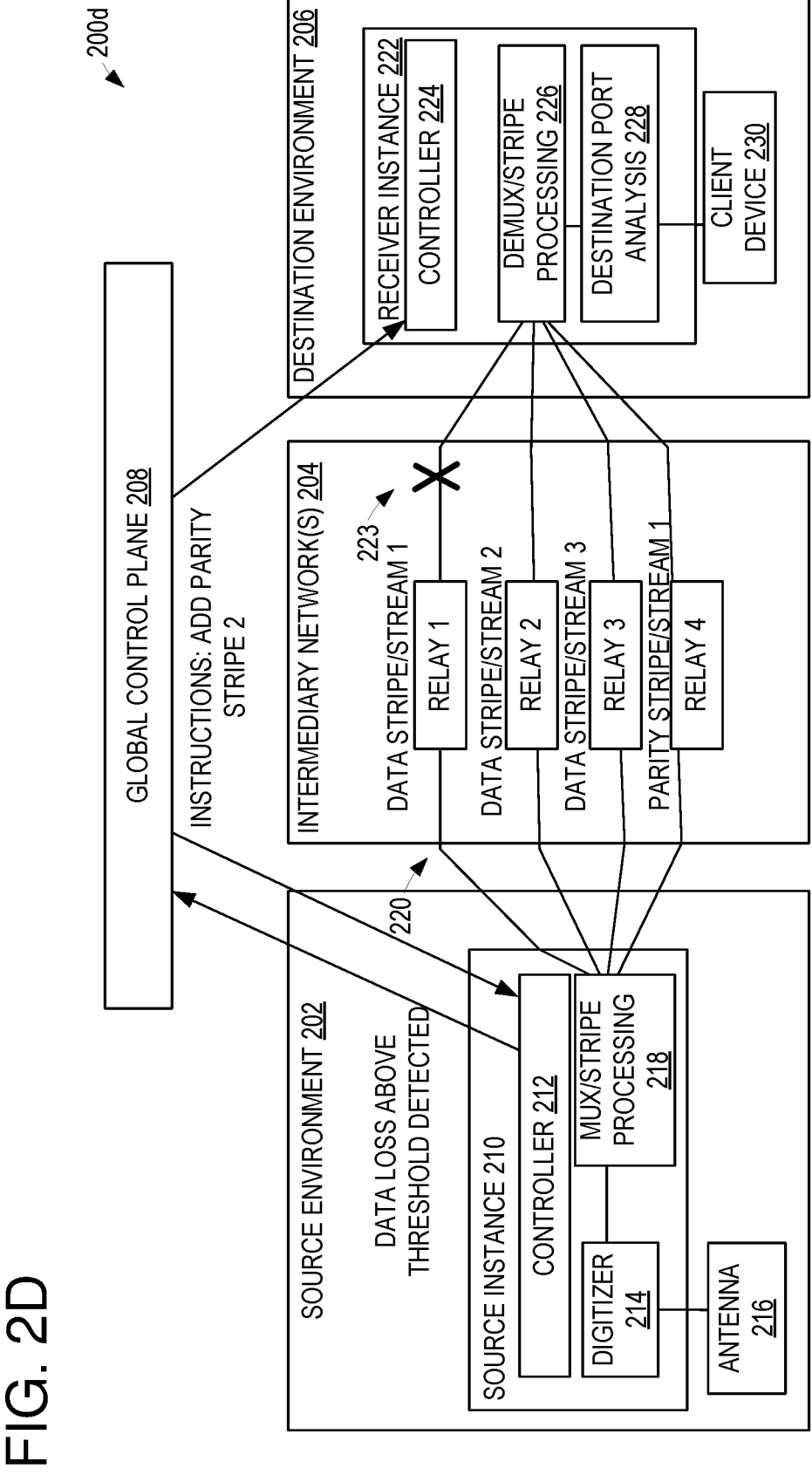
Figure 2E:
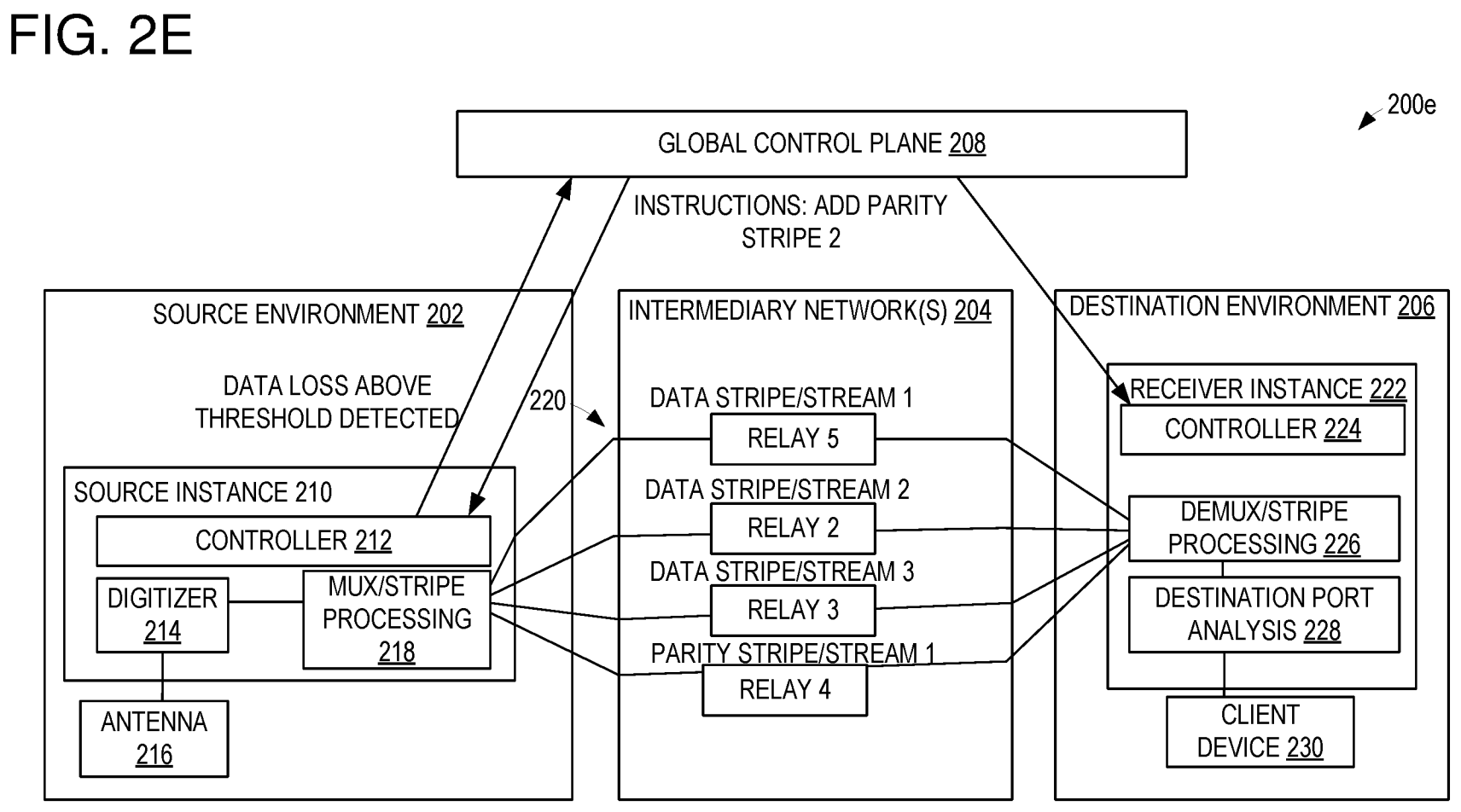

FIGS. 2D and 2E show another example of a configuration adjustment that may be made to account for network conditions. For example, as described herein, data streams and parity streams may be transmitted through different relays toward a destination environment, for example, by changing one or more of a destination address/port and/or source address/port to route the streams through intermediary networks differently. In the illustrated example of 200d, data stripe/stream 1 is configured to be routed through relay 1, data stripe/stream 2 through relay 2, etc. In other examples, a first group of one or more streams may be routed through a first relay/route, a second group of one or more streams may be routed through a second relay/route, etc. Although shown as a relay for representation, it is to be understood that the relay may correspond to a route through one or more intermediary networks—for example, data stripe 1 may be routed through a border network to a first content delivery network, then to an edge network before reaching destination environment 206. In such an example, data stripe 2 may be routed through the border network or a different border network to a second content delivery network, then to the edge network or a different edge network before reaching destination environment 206. As described above, the routing may be determined based on information in headers of the encapsulated data and/or parity streams, including destination and source ports and addresses. In response to a detected issue 225 with relay 1, such as congestion above a threshold, data loss above a threshold, and/or any other condition affecting throughput and/or data integrity, the routing of data stripe/stream 1 may be changed to pass through a different relay 5, as shown at 200*e*.

FIG. 3 shows a flow chart of an example method 300 for transmitting real-time data flows in a communication system. Method 300 may be performed by a source system, such as source system 102 of FIG. 1 (e.g., and associated nodes as described above with respect to FIG. 1), to process and transmit data through a network. At 302, the method includes digitizing real-time data from a source (e.g., an antenna or other data source, as described above with respect to FIG. 1) to generate real-time digital data. For example, the source system performing method 300 may be directly connected to the antenna and/or otherwise configured to receive analog output from the antenna. In order to prepare for transmission, the analog data may be digitized to allow the data to be sent over digital communication channels.

At 304, the method includes generating (e.g., via an interleaving operation, as described in more detail above with respect to FIG. 1) a plurality of sub-flows including data stripes and parity stripes. For example, the data stripes may include streams of the real-time digital data, and the parity stripes may include parity information for error correcting the streams of the real-time digital data. Parameters such as the number of data stripes and parity stripes may be tuned based on control instructions provided by a global control plane, as described above with respect to global control plane 116 of FIG. 1. For example, the global control plan may provide an initial configuration for the generation of the sub-flows based on expected network conditions (e.g., bandwidth, congestion, latency, throughput, etc.), client preferences, and/or other factors.

At 306, the method includes encrypting the plurality of sub-flows. For example, as indicated at 308, the encryption may be performed on each data stripe and parity strip (generated at 304) respectively in parallel and/or independently. The sub-flows may be encrypted as described above with respect to the operation of the encryption units 120*a*/120*b* of FIG. 1, for example, using different encryption keys for each sub-flow.

At 310, the method includes time encoding the plurality of sub-flows. For example, as indicated at 312, the time encoding may be performed on each data stripe and parity strip (generated at 304) respectively in parallel and/or independently. The sub-flows may be time encoded as described above with respect to the operation of the time encoding units 124*a*/124*b* of FIG. 1, for example, to add error correction data to the respective streams and/or associate the streams with a corresponding sequence number for use in reconstituting the sub-flows downstream (e.g., at a destination).

At 314, the method includes transmitting the plurality of sub-flows along different respective paths through a network toward a destination (e.g., to a destination address associated with a destination system, such as destination system 106 of FIG. 1). As noted at 314, the sub-flows may be transmitted substantially simultaneously and/or in parallel with one another (e.g., data from the incoming real-time data flow digitized at 302 may flow toward the destination in parallel at the same time). Parameters such as the port numbers and/or other information that affects a path/route that the sub-flows traverse through the network may be tuned based on control instructions provided by a global control plane, as described above with respect to global control plane 116 of FIG. 1. For example, the global control plan may provide an initial configuration for transmitting the sub-flows based on expected network conditions (e.g., bandwidth, congestion, latency, throughput, etc.), client preferences, and/or other factors.

At 316, the method includes adjusting parameters of the sub-flow generation and/or transmission based on instructions from a global control plane system. For example, as described above, an initial configuration may be provided by the global control plane system to set parameters for generating the sub-flows, transmitting the sub-flows, and/or other factors of processing the sub-flows. Responsive to real-time (e.g., observed performance factors such as latency, data loss, etc.) and/or historical network conditions (e.g., expected conditions based on time of day, observed patterns, and/or other conditions) including in-band and/or scheduled optimizations, updated client instructions, and/or other factors, the configuration may be tuned during communication of the sub-flows to increase reliability, throughput, and/or other parameters of the communication. For example, the method may return to 304 to generate and/or otherwise process the sub-flows based on the adjusted parameters.

FIG. 4 shows a flow chart of an example method 400 for receiving real-time data flows in a communication system. Method 400 may be performed by a destination system, such as destination system 106 of FIG. 1 (e.g., and associated nodes as described above with respect to FIG. 1), to process and reconstitute data received via a network. At 402, the method includes receiving a plurality of sub-flows including data stripes and parity stripes from a source device/system via a network. For example, the sub-flows transmitted according to method 300 of FIG. 3 may be received at 402, where the sub-flows traverse different paths from the source device/system across the network.

At 404, the method includes time decoding the plurality of sub-flows. For example, as indicated at 406, the time decoding may be performed on each data stripe and parity strip (received at 402) respectively in parallel and/or independently. The sub-flows may be time decoded as described above with respect to the operation of the time decoding units 134*a*/134*b* of FIG. 1, for example, in coordination with information used to time encode the sub-flows in method 300 of FIG. 3. The time decoding may include performing a first stage of error correction on a respective sub-flow using error correction data found within the respective sub-flow in some examples.

At 408, the method includes decrypting the plurality of sub-flows. For example, as indicated at 410, the decryption may be performed on each data stripe and parity strip (received at 402) respectively in parallel and/or independently. The sub-flows may be decrypted as described above with respect to the operation of the decryption units 138*a*/138*b* of FIG. 1, for example, using different decryption keys for each sub-flow.

At 412, the method includes reconstituting the real-time digital data flow by de-interleaving (e.g., reordering, blending, reframing, and/or otherwise demuxing) data from the plurality of sub-flows. For example, using the sequence numbers of the sub-flows, data from each data sub-flow may be ordered to build the original real-time digital data flow received from an antenna (e.g., as digitized at 302 of method 300 of FIG. 3). In the event that a sequence number is missing (e.g., not received within a threshold period of time after receiving a data sub-flow with a prior sequence number), error correction data from a parity sub-flow may be used to attempt to recover the data from the missing data sub-flow.

At 414, the method includes adjusting parameters of the reconstitution based on instructions from a global control plane system. For example, as described above at 316 of FIG. 3, the number of data and/or parity sub-flows, transmission paths for the sub-flows, and/or other parameters may be adjusted based on network conditions, and an indication of these adjustments may be provided to the destination system to adjust the processing of the received sub-flows accordingly.

FIG. 5 shows a flow chart of another example method 500 for transmitting real-time data flows in a communication system. Method 500 may be performed by a source system, such as source system 102 of FIG. 1 (e.g., and associated nodes as described above with respect to FIG. 1), to process and transmit data through a network. At 502, the method includes receiving a real-time digital data flow. For example, the real-time digital data flow may originate from analog data output by an antenna, and digitized by the source system and/or an upstream digitizer (e.g., as described above with respect to digitizer 110 of FIG. 1 and/or the digitizing at 302 of FIG. 3).

At 504, the method includes generating a plurality of data streams of the real-time digital data flow. For example, as described above with respect to the operations of the stripe and encoding unit 114 of FIG. 1 and the sub-flow generation at 304 of FIG. 3, the plurality of data streams may be generated from the real-time digital data flow based on initial configuration instructions from a global control plane (e.g., to tune a number of data streams that are generated).

At 506, the method includes generating at least one parity stream including parity data for the real-time digital data flow. For example, as further described above with respect to the operations of the stripe and encoding unit 114 of FIG. 1 and the sub-flow generation at 304 of FIG. 3, one or more parity streams may be generated to include error correction information for the real-time digital data flow, for example, to help recover data from any missing data streams that are not received at a destination device/system.

At 508, the method includes transmitting the plurality of data streams and the at least one parity stream (e.g., in parallel and/or substantially simultaneously) along different respective paths (e.g., through a network) to a destination device. For example, as described above with respect to transmission units 128a/128b of FIG. 1 and the transmission at 314 of FIG. 3, the plurality of streams (data and parity) may be designated with different source/destination ports and/or other metadata affecting a path each stream takes across a network to the destination device/system in order to cause the streams to traverse different paths to the destination device/system. As each path is independently susceptible to congestion or other network issues, sending the streams down different paths increases overall throughput by allowing streams affected by congestion or other network issues to be compensated for using streams sent along other paths that are not affected by congestion or other network issues.

At 510, the method includes adjusting a parameter of the generation of the streams and/or the transmission of the streams based on network conditions. For example, as described above at 316 of FIG. 3 and with respect to global control plane 116 of FIG. 1, the number of data and/or parity streams, transmission paths for the streams, and/or other parameters may be adjusted based on network conditions, and an indication of these adjustments may be provided to the source system to adjust the generation of the streams and/or transmission of the streams accordingly.

FIG. 6 is a computing system diagram of a network-based compute service provider 600 that illustrates one environment in which embodiments described herein can be used. For example, the compute service provider 600 may provide an example environment for the communication system 100 of FIG. 1 and/or the compute service provider 600 may include and/or be included in a source system of a communication system (e.g., source system 102 of FIG. 1 and/or source environment 202 of FIG. 2A-2E) and/or a destination system of a communication system (e.g., destination system 106 of FIG. 1 and/or destination environment 206 of FIGS. 2A-2E). One or more components of the compute service provider 600 may additionally or alternatively comprise an example environment of a global control plane, such as global control plane 116 of FIG. 1 and/or global control plane 208 of FIGS. 2A-2E and/or intermediary devices between a source system/environment and a destination system environment (e.g., intermediary network(s) 204 of FIGS. 2A-2E). Operations of methods 300, 400, and/or 500 of FIGS. 3, 4, and 5, respectively, may be performed using one or more components of the compute service provider 600 in some examples. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the computer service provider 600 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e., a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications. An example application executed by the instances 606 and/or additional processing that may be performed by a server includes a multipath stream processing flow 618, shown in server 602D by way of example. The multipath stream processing flow 618 may include one or more of the nodes of source system 102 of FIG. 1 and/or destination system 106 of FIG. 1, the mux/ stripe processing system 218 of FIGS. 2A-2E, and/or the demux/stripe processing system 226 of FIGS. 2A-2E in some examples. For example, the multipath stream processing flow 618 may include nodes configured to perform one or more of the operations of methods 300, 400, and/or 500 of FIGS. 3, 4, and 5, respectively, to generate and process data and parity streams corresponding to an incoming real-time data stream from an antenna and/or to process and reconstitute the real-time data stream using generated data and parity streams, as described in the examples of FIGS. 1-5 above.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. A multipath stream configuration component 616 may be configured to store and/or adjust configuration settings for generating, processing, and transmitting a plurality of data and parity streams. For example, the multipath stream configuration component 616 may be used to generate control instructions to control parameters of the stream generation, processing, and/or transmitting as described above with respect to the global control plane 116 of FIG. 1, the global control plane 208 of FIGS. 2A-2E, and/or the adjusting of parameters described at 316 of FIG. 3, 414 of FIGS. 4, and 510 of FIG. 5.

A network 630 can be utilized to interconnect the server computers 602A-602D and the server computer 604. The network 630 can be a local area network (LAN) and can be connected to a Wide Area Network (WAN) 640 so that end customers can access the compute service provider 600. It should be appreciated that the network topology illustrated in FIG. 6 has been simplified and that many more networks and networking devices can be utilized to interconnect the various computing systems disclosed herein.

Figure 7:
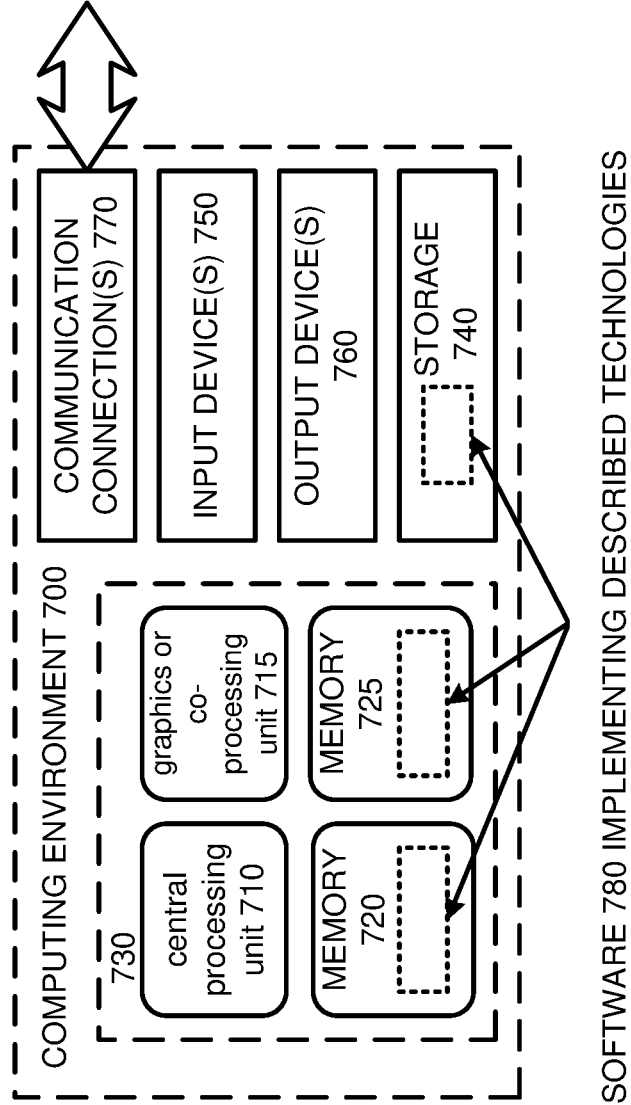
FIG. 7 depicts a generalized example of a suitable computing environment in which the described innovations may be implemented.

FIG. 7 depicts a generalized example of a suitable computing environment 700 in which the described innovations may be implemented. For example, the computing environment 700 may provide an example environment for the communication system 100 of FIG. 1 and/or the computing environment 700 may include and/or be included in a source system of a communication system (e.g., source system 102 of FIG. 1 and/or source environment 202 of FIG. 2A-2E) and/or a destination system of a communication system (e.g., destination system 106 of FIG. 1 and/or destination environment 206 of FIGS. 2A-2E). One or more components of the computing environment 700 may additionally or alternatively comprise an example environment of a global control plane, such as global control plane 116 of FIG. 1 and/or global control plane 208 of FIGS. 2A-2E. Operations of methods 300, 400, and/or 500 of FIGS. 3, 4, and 5, respectively, may be performed using one or more components of the computing environment 700 in some examples. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. For example, the communication connection(s) 770 may enable the sub-flows/streams/stripes generated by the communication system 100 of FIG. 1 or 200a-200e of FIGS. 2A-2E to be transmitted to a destination address (e.g., for receipt by destination system 106 of FIG. 1 and/or destination environment 206 of FIGS. 2A-2E) and/or received by a destination (e.g., destination system 106 of FIG. 1 and/or destination environment 206 of FIGS. 2A-2E).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods (e.g., methods 300, 400, and 500 of FIGS. 3-5) can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A communication system comprising:

an antenna configured to transmit real-time data:

a source device configured to receive the real-time data from the antenna, the source device including one or more source-side nodes comprising one or more first memory devices storing instructions executable to:

digitize the real-time data from the antenna to generate real-time digital data, generate, from the real-time digital data, a plurality of sub-flows including data stripes and parity stripes, the plurality of sub-flows including a first sub-flow including a first data stripe and a second sub-flow including a first parity stripe, encrypt the plurality of sub-flows, time encode the plurality of sub-flows, and transmit the plurality of sub-flows in parallel along different respective paths through a network to a destination address, wherein the first sub-flow is transmitted along a first path through the network to the destination address and the second sub-flow is transmitted along a second path through the network to the destination address that is different from the first path:

a destination device associated with the destination address and configured to receive the plurality of sub-flows from the source device via the network, the destination device including one or more destination-side nodes comprising one or more second memory devices storing instructions executable to:

time decode the plurality of sub-flows, decrypt the plurality of sub-flows, and reconstitute the real-time digital data by blending data from the plurality of sub-flows; and a global control plane system configured to receive real-time network conditions associated with the different respective paths to the destination and generate control instructions to adjust parameters of the one or more source-side nodes and the one or more destination-side nodes based on the real-time network conditions associated with the different respective paths.

2. The communication system of claim 1, wherein the control instructions include instructions to adjust a number of the data stripes or the parity stripes based on feedback from the source device relating to data flow loss on the respective paths through the network.

3. The communication system of claim 1, wherein the plurality of sub-flows includes a first data or parity stripe transmitted along a first path of the different respective paths through the network, wherein the control instructions include instructions to remove the first data or parity stripe and add a second data or parity stripe configured to be transmitted along a second path through the network to the destination, and wherein the second path is different from the first path.

4. The communication system of claim 1, wherein one or both of the source device and the destination device are included in a cloud computing system, and wherein the real-time data is transmitted through the network as unidirectional data.

5. The communication system of claim 1, wherein the plurality of sub-flows are transmitted to through the network in a bufferless manner to be reconstituted as real-time data at the destination device.

6. The communication system of claim 1, wherein generating the plurality of sub-flows comprises associating each data stripe with a corresponding respective sequence number, wherein reconstituting the real-time digital data comprises decoding and blending data from the received sub-flows using sequence numbers, and wherein the destination device is configured to use one of the parity stripes to perform error correction responsive to determining that a selected data stripe with an expected sequence number is not received within a threshold amount of time.

7. A computer-implemented method comprising:

receiving a real-time digital data flow;

generating a plurality of data streams of the real-time digital data flow;

generating at least one parity stream including parity data for the real-time digital data flow;

transmitting the plurality of data streams and the at least one parity stream in parallel along different respective network paths to a destination device; and adjusting a parameter of the generation of the plurality of data streams, the generation of the at least one parity stream, or the transmission of the plurality of data streams and the at least one parity stream based on network conditions associated with the different respective network paths to the destination device.

8. The computer-implemented method of claim 7, wherein adjusting the parameter includes adjusting a number of data streams of the real-time digital data flow or a number of parity streams for the real-time digital data flow that are generated based on the network conditions.

9. The computer-implemented method of claim 7, wherein adjusting the parameter includes changing one of the different respective network paths to the destination device based on the network conditions.

10. The computer-implemented method of claim 7, wherein the computer-implemented method is performed by one or more nodes of a source device, wherein the network conditions include an amount of data loss detected by the source device and fed back to a global control plane, and wherein the parameter is adjusted based on control instructions received from the global control plane.

11. The computer-implemented method of claim 7, wherein the computer-implemented method is performed by one or more nodes of a ground control system coupled to an antenna, and wherein the real-time digital data flow includes digitized data generated from real-time data received by the antenna.

12. The computer-implemented method of claim 7, further comprising encrypting the plurality of data streams and the at least one parity stream using different respective encryption keys.

13. The computer-implemented method of claim 12, further comprising, for each data stream and parity stream, time encoding the data stream or parity stream after encrypting the data stream or parity stream.

14. The computer-implemented method of claim 7, wherein at least one of the plurality of data streams is transmitted through a first relay device in one or more intermediate networks, and the at least one parity stream is transmitted through at least a second relay device in one or more intermediate networks that is different from the first relay device, and wherein at least the first and second relay devices are configured to time decode the plurality of data streams and the at least one parity stream and time re-encode the plurality of data streams and the at least one parity stream before forwarding to the destination device.

15. The computer-implemented method of claim 7, wherein transmitting the plurality of data streams and the at least one parity stream comprises scheduling a transmission of the plurality of data streams and the at least one parity stream on the different respective paths based on bandwidth or network conditions for the different respective paths.

16. The computer-implemented method of claim 7, wherein the network conditions include a measure of performance of decoding the plurality of data streams at the destination device, and wherein adjusting the parameter includes increasing a number of parity streams when the performance of decoding satisfies a first threshold condition or decreasing the number of parity streams when the performance of decoding satisfies a second threshold condition.

17. One or more computer-readable storage media comprising computer-executable instructions that, when executed, cause a computing system to perform a method comprising:

receiving, at a destination device, a plurality of data streams corresponding to a real-time digital data flow from an antenna and a parity stream for the real-time digital data flow, each of the plurality of data streams and the parity stream traversing, in parallel, a different respective path across a network between a source device and the destination device;

reconstituting the real-time digital data flow by blending data from the plurality of data streams according to configuration parameters received from a global control plane and selectively performing error correction using the parity stream; and adjusting the configuration parameters for reconstituting the real-time digital data flow responsive to receiving updated control instructions from the global control plane based on network conditions.

18. The one or more computer-readable storage media of claim 17, wherein the updated control instructions include a change in a number of data streams or a number of parity streams based on detected loss of data from the data and parity streams along the respective paths.

19. The one or more computer-readable storage media of claim 17, wherein the updated control instructions include a changing in one or more of the different respective paths based on real-time or predicted network conditions of the network.

20. The one or more computer-readable storage media of claim 17, wherein the instructions, upon execution, further cause the computer system to time decode the plurality of data streams and the parity stream and decrypt the plurality of data streams and the parity stream prior to reconstituting the real-time digital data flow.

\* \* \* \* \*